US008467892B2

(12) United States Patent
Steinberg

(10) Patent No.: US 8,467,892 B2
(45) **Date of Patent: *Jun. 18, 2013**

(54) CONTENT-BASED AUDIO COMPARISONS

(75) Inventor: Daniel Steinberg, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 12/723,423

(22) Filed: Mar. 12, 2010

(65) Prior Publication Data

US 2010/0168887 A1 Jul. 1, 2010

Related U.S. Application Data

(63) Continuation of application No. 11/222,291, filed on Sep. 8, 2005, now Pat. No. 7,698,008.

(51) Int. Cl.
*G06F 17/00* (2006.01)

(52) U.S. Cl.
USPC .......... 700/94

(58) Field of Classification Search
USPC .......... 700/94; 381/56, 96–109; 704/200.1, 704/231, E11.002, E11.019, 500–504
See application file for complete search history.

(56) References Cited

U.S. PATENT DOCUMENTS

| | | | | |
|---|---|---|---|---|
| 5,774,567 | A | 6/1998 | Heyl | |
| 7,698,008 | B2 * | 4/2010 | Steinberg | 700/94 |
| 2002/0198703 | A1 | 12/2002 | Lydecker et al. | |
| 2004/0215447 | A1 | 10/2004 | Sundareson | |
| 2005/0075862 | A1 | 4/2005 | Paulin | |

FOREIGN PATENT DOCUMENTS

| | | |
|---|---|---|
| JP | 04335700 | 11/1992 |
| WO | WO9322875 A1 | 11/1993 |

OTHER PUBLICATIONS

Examination Report dated Oct. 1, 2009 in EP Application No. 06788398.3 filed Jul. 24, 2006, published as Publication No. 1 941 493 on Jul. 9, 2008 entitled "Content-Based Audio Comparisons," 3 pages.
International Search Report and Written Opinion dated Feb. 23, 2007 from Office Leila Kuhnen in PCT Application No. PCT/US2006/028803 filed Jul. 24, 2006, published as WO 2007/030215 on Mar. 15, 2007 entitled "Content-Based Audio Comparisons," 13 pages.
Communication Pursuant to Article 94(3) EPC dated Dec. 7, 2011 in Application No. 06 788 398.3-2223, 6 pages.

* cited by examiner

*Primary Examiner* — Andrew C Flanders
(74) *Attorney, Agent, or Firm* — Blakely, Sokoloff, Taylor & Zafman LLP

(57) ABSTRACT

A content-based comparison of a plurality of digital audio signals can be performed by generating, for a portion of a corresponding channel, a first set of spectral characteristics associated with a first audio signal and a second set of spectral characteristics associated with a second audio signal; comparing the first set of spectral characteristics with the second set of spectral characteristics to identify a degree of difference; and determining, for the portion of the corresponding channel, whether the first audio signal is substantially identical to the second audio signal based on the identified degree of difference. Further, one or more match criteria can be received from a user and utilized to determine, for the portion of the corresponding channel, that the first audio signal is substantially identical to the second audio signal if the identified degree of difference is within the received match criteria.

18 Claims, 6 Drawing Sheets

CONTENT-BASED AUDIO COMPARISONS

PRIORITY CLAIMS AND RELATED APPLICATION INFORMATION

This application is a continuation (and claims the benefit of priority under 35 USC 120) of U.S. application Ser. No. 11/222,291, filed Sep. 8, 2005. The disclosure of the prior application is considered part of (and is incorporated by reference in) the disclosure of this application.

BACKGROUND

The present disclosure relates to digital audio files, and to systems and methods for comparing the contents of two or more such files.

Digital-based electronic media formats have become widely accepted. The development of faster computer processors, high-density storage media, and efficient compression and encoding algorithms have led to an even more widespread implementation of digital audio media formats in recent years. Digital compact discs (CDs) and digital audio file formats, such as MP3 (MPEG Audio-layer 3) and WAV, are now commonplace. Some of these formats store the digitized audio information in an uncompressed fashion while others feature compression. The ease with which digital audio files can be generated, duplicated, and disseminated also has helped increase their popularity.

Audio information can be detected as an analog signal and represented using an almost infinite number of electrical signal values. An analog audio signal is subject to electrical signal impairments, however, that can negatively affect the quality of the recorded information. Any change to an analog audio signal value can result in a noticeable defect, such as distortion or noise. Because an analog audio signal can be represented using an almost infinite number of electrical signal values, it is also difficult to detect and correct defects. Moreover, the methods of duplicating analog audio signals cannot approach the speed with which digital audio files can be reproduced. These and many other problems associated with analog audio signals can be overcome, without a significant loss of information, simply by digitizing the audio signals.

FIG. 1 presents a portion of an analog audio signal 10. The amplitude of the analog audio signal 10 is shown with respect to the vertical axis 12 and the horizontal axis 14 indicates time. In order to digitize the analog audio signal 10, the waveform 16 is sampled at periodic intervals, such as at a first sample point 18 and a second sample point 20. A sample value representing the amplitude of the waveform 16 is recorded for each sample point. If the sampling rate is less than twice the frequency of the waveform being sampled, the resulting digital signal will be substantially identical to the result obtained by sampling a waveform of a lower frequency. As such, in order to be adequately represented, the waveform 16 must be sampled at a rate greater than twice the highest frequency that is to be included in the reconstructed signal. To ensure that the waveform is free of frequencies higher than one-half of the sampling rate, which is also known as the Nyquist frequency, the audio signal 10 can be filtered prior to sampling. Therefore, in order to preserve as much audible information as possible, the sampling rate should be sufficient to produce a reconstructed waveform that cannot be differentiated from the waveform 16 by the human ear.

The human ear generally cannot detect frequencies greater than 16-20 kHz, so the sampling rate used to create an accurate representation of an acoustic signal should be at least 32 kHz. For example, compact disc quality audio signals are generated using a sampling rate of 44.1 kHz. Once the sample value associated with a sample point has been determined, it can be represented using a fixed number of binary digits, or bits. Encoding the infinite possible values of an analog audio signal using a finite number of binary digits will almost necessarily result in the loss of some information. Because high-quality audio is encoded using up to 24-bits per sample, however, the digitized values closely approximate the original analog values. The digitized values of the samples comprising the audio signal can then be stored using a digital-audio file format.

The technique by which analog audio information is digitized is flexible and can be implemented in many different ways. For example, an analog signal can be sampled at many different locations and the sample values can be quantized to varying degrees of accuracy. Because an analog audio signal is represented digitally using only discrete samples of the constant waveform and because the continuously varying signal level is quantized into finite values, two digital audio files representing the same analog audio signal can be comprised of very different bits. Also, the bits representing an audio signal can be stored using different file formats, such as .DV or .MOV. Because such file formats can store portions of an audio signal in different locations within a file, it can be impossible to recognize the commonality between two identical audio signals.

FIG. 2 presents an analog audio signal 50 that is digitized by sampling the waveform 52 at a plurality of points. For example, the waveform 52 can be sampled at the points associated with solid lines, including points 54 and 56. Alternatively, the waveform 52 can be sampled at the points associated with dashed lines, including points 58 and 60. Although the sampling frequency associated with the solid lines and the dashed lines is the same, samples are taken at different points in time along the waveform 52. If the sampling frequency associated with the solid lines and the dashed lines is equal to or greater than the Nyquist rate, the waveform 52 can be accurately reconstructed from either of the resulting digital representations. Therefore, the waveform reconstructed using the sample points associated with the solid lines, including the points 54 and 56, will be substantially identical to the waveform reconstructed using the sample points associated with the dashed lines, including the points 58 and 60. Still, the bits associated with the respective sample points can be very different because those sample points occur at different points in time.

A similar result occurs if separate digital audio files are created by sampling the waveform 52 at different rates. For example, a first digital audio file can be generated by sampling the waveform 52 at a sampling rate of 44 kHz and a second digital audio file can be generated by sampling the waveform 52 at a sampling rate of 45 kHz. If all other factors are identical, the reconstructed waveform produced from the first digital audio file will be substantially identical to the reconstructed waveform produced from the second digital audio file. The bits of the first digital audio file, however, will differ from the bits of the second digital audio file because the waveform 52 is sampled at different points.

Additionally, different digital representations of the waveform 52 can result from a single set of samples if the sample values are quantized using a different number of bits. For example, if the sample values are quantized using 20-bits to generate a first digital audio file and 24-bits to generate a second digital audio file, the first and second files will differ significantly at the bit level. Similarly, differing digital representations of an identical waveform also can be generated by applying differing compression techniques.

As discussed above, an analog audio signal can be digitized in accordance with a variety of techniques and methods. Therefore, it is possible for a large number of distinct binary representations to produce identical, or substantially identical, audio signals. In order to determine whether the audio signals associated with two digital audio files are identical, it is thus necessary to compare the files using some measure other than the bits that comprise those files. For example, a developer of audio signal processing hardware or software can find it necessary to compare two or more digital audio files, such as a first file that represents an audio signal after it has been processed and a second file that represents a control sample. The control sample can be any file that represents a known audio signal, such as a file representing the audio signal prior to processing or a reference signal that is an accurate representation of the desired audio signal after processing. The comparison can thus be used to identify any discontinuities that might have been introduced by the processing operation.

SUMMARY

The need to implement strategies that will permit a comparison of the contents of two or more digital audio files was recognized by the present inventor. Further, the need to permit an efficient comparison of a plurality of digital audio files using flexible criteria also is recognized. Accordingly, the techniques and apparatus described here implement algorithms for content-based comparisons of a plurality of digital audio signals.

In general, in one aspect, the techniques can be implemented to include generating, for a portion of a corresponding channel, a first set of spectral characteristics associated with a first audio signal and a second set of spectral characteristics associated with a second audio signal; comparing the first set of spectral characteristics with the second set of spectral characteristics to identify a degree of difference; and determining, for the portion of the corresponding channel, whether the first audio signal is substantially identical to the second audio signal based on the identified degree of difference.

The techniques also can be implemented to include receiving, from a user, one or more match criteria and determining, for the portion of the corresponding channel, that the first audio signal is substantially identical to the second audio signal if the identified degree of difference is within the received match criteria. Additionally, the techniques can be implemented to include determining, for the portion of the corresponding channel, that the first audio signal is substantially identical to the second audio signal if the identified degree of difference is within predetermined match criteria.

The techniques also can be implemented such that the portion of the corresponding channel comprises a window of samples. Further, the techniques can be implemented such that the spectral characteristics represent amplitude values associated with one or more component frequencies. Additionally, the techniques can be implemented such that the spectral characteristics represent average amplitude values associated with one or more component frequencies.

The techniques also can be implemented to include generating, for a portion of a second corresponding channel, a third set of spectral characteristics associated with the first audio signal and a fourth set of spectral characteristics associated with the second audio signal; comparing the third set of spectral characteristics with the corresponding fourth set of spectral characteristics to identify a second degree of difference; and determining, for the portion of the second corresponding channel, whether the first audio signal is substantially identical to the second audio signal based on the identified second degree of difference. Further, the techniques can be implemented to include mixing a plurality of channels associated with the first audio signal to generate a single channel. Additionally, the techniques can be implemented to include scaling a volume of at least one of the plurality of channels associated with the first audio signal.

The techniques also can be implemented to include generating a summary of the first set of spectral characteristics associated with the first audio signal. Further, the techniques can be implemented to include comparing the summary of the first set of spectral characteristics associated with the first audio signal with a summary of a third set of spectral characteristics associated with a third audio signal to identify a second degree of difference; and determining whether the first audio signal is substantially identical to the third audio signal based on the identified second degree of difference.

In general, in another aspect, the techniques can be implemented to include machine-readable instructions for performing a content-based comparison of a plurality of digital audio signals, the machine-readable instructions being operable to perform operations comprising generating, for a portion of a corresponding channel, a first set of spectral characteristics associated with a first audio signal and a second set of spectral characteristics associated with a second audio signal; comparing the first set of spectral characteristics with the second set of spectral characteristics to identify a degree of difference; and determining, for the portion of the corresponding channel, whether the first audio signal is substantially identical to the second audio signal based on the identified degree of difference.

The techniques also can be implemented to include machine-readable instructions operable to receive, from a user, one or more match criteria; and determine, for the portion of the corresponding channel, that the first audio signal is substantially identical to the second audio signal if the identified degree of difference is within the received match criteria. Further, the techniques can be implemented to include machine-readable instructions operable to determine, for the portion of the corresponding channel, that the first audio signal is substantially identical to the second audio signal if the identified degree of difference is within predetermined match criteria. Additionally, the techniques can be implemented such that the portion of the corresponding channel comprises a window of samples. The techniques further can be implemented to include machine-readable instructions operable to generate spectral characteristics representing amplitude values associated with one or more component frequencies.

The techniques also can be implemented to include machine-readable instructions operable to generate spectral characteristics representing average amplitude values associated with one or more component frequencies. Further, the techniques can be implemented to include machine-readable instructions operable to generate, for a portion of a second corresponding channel, a third set of spectral characteristics associated with the first audio signal and a fourth set of spectral characteristics associated with the second audio signal; compare the third set of spectral characteristics with the corresponding fourth set of spectral characteristics to identify a second degree of difference; and determine, for the portion of the second corresponding channel, whether the first audio signal is substantially identical to the second audio signal based on the identified second degree of difference. Additionally, the techniques can be implemented to include machine-readable instructions operable to mix a plurality of channels associated with the first audio signal to generate a single channel.

The techniques also can be implemented to include machine-readable instructions operable to scale a volume of at least one of the plurality of channels associated with the first audio signal. Further, the techniques can be implemented to include machine-readable instructions operable to generate a summary of the first set of spectral characteristics associated with the first audio signal. Additionally, the techniques can be implemented to include machine-readable instructions operable to compare the summary of the first set of spectral characteristics associated with the first audio signal with a summary of a third set of spectral characteristics associated with a third audio signal to identify a second degree of difference and determine whether the first audio signal is substantially identical to the third audio signal based on the identified second degree of difference.

In general, in another aspect, the techniques can be implemented to include processor electronics configured to generate, for a portion of a corresponding channel, a first set of spectral characteristics associated with a first audio signal and a second set of spectral characteristics associated with a second audio signal; compare the first set of spectral characteristics with the second set of spectral characteristics to identify a degree of difference; and determine, for the portion of the corresponding channel, whether the first audio signal is substantially identical to the second audio signal based on the identified degree of difference.

The techniques also can be implemented to include processor electronics configured to receive, from a user, one or more match criteria and determine, for the portion of the corresponding channel, that the first audio signal is substantially identical to the second audio signal if the identified degree of difference is within the received match criteria. Further, the techniques can be implemented to include processor electronics configured to determine, for the portion of the corresponding channel, that the first audio signal is substantially identical to the second audio signal if the identified degree of difference is within predetermined match criteria. Additionally, the techniques can be implemented to include processor electronics configured to generate, for a portion of a second corresponding channel, a third set of spectral characteristics associated with the first audio signal and a fourth set of spectral characteristics associated with the second audio signal; compare the third set of spectral characteristics with the corresponding fourth set of spectral characteristics to identify a second degree of difference; and determine, for the portion of the second corresponding channel, whether the first audio signal is substantially identical to the second audio signal based on the identified second degree of difference.

In general, in another aspect, the techniques can be implemented to include a processor means for generating, for a portion of a corresponding channel, a first set of spectral characteristics associated with a first audio signal and a second set of spectral characteristics associated with a second audio signal; comparing the first set of spectral characteristics with the second set of spectral characteristics to identify a degree of difference; and determining, for the portion of the corresponding channel, whether the first audio signal is substantially identical to the second audio signal based on the identified degree of difference.

The techniques also can be implemented to include a processor means for receiving, from a user, one or more match criteria and determining, for the portion of the corresponding channel, that the first audio signal is substantially identical to the second audio signal if the identified degree of difference is within the received match criteria. Further, the techniques can be implemented to include a processor means for determining, for the portion of the corresponding channel, that the first audio signal is substantially identical to the second audio signal if the identified degree of difference is within predetermined match criteria. Additionally, the techniques can be implemented to include a processor means for generating, for a portion of a second corresponding channel, a third set of spectral characteristics associated with the first audio signal and a fourth set of spectral characteristics associated with the second audio signal; comparing the third set of spectral characteristics with the corresponding fourth set of spectral characteristics to identify a second degree of difference; and determining, for the portion of the second corresponding channel, whether the first audio signal is substantially identical to the second audio signal based on the identified second degree of difference.

The techniques described in this specification can be implemented to realize one or more of the following advantages. For example, the techniques can be implemented to permit a content-based comparison of a plurality of digital audio files to determine whether they represent identical audio signals. The techniques also can be implemented to identify any differences between two or more versions of the same digital audio file, such as a digital audio file that has been subjected to processing and a version of the same file as it existed prior to processing. Automating such comparisons can substantially reduce the time and cost involved in validating processing devices and methods. Additionally, the techniques can be implemented such that a plurality of digital audio files can be searched to identify each of the files that represents an audio signal identical to that represented by a specific file. The techniques also can be implemented to permit the specification of one or more parameters associated with a content-based comparison of two or more digital audio files. Additionally, the techniques can be implemented such that a first audio file can be searched to determine whether it contains a second audio file, such as an audio clip.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

A content-based comparison can be performed for a plurality of digital audio files by comparing the spectral characteristics associated with each of the files, such as the average amplitude value corresponding to each of a plurality of frequencies. A difference between the spectral characteristics associated with a first digital audio file and the spectral characteristics associated with a second digital audio file provides an indication that the contents of those files also differs. Further, if one or more differences are detected between the spectral characteristics of the first and second digital audio files, analysis of their respective spectral characteristics also can be used to identify the nature and magnitude of those differences.

Figure 1:
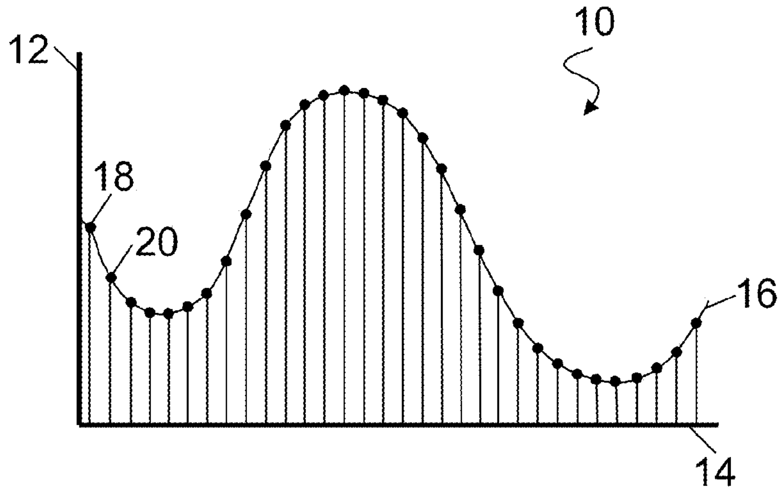
FIGS. 1-2 describe sampling analog waveforms.
Figure 2:
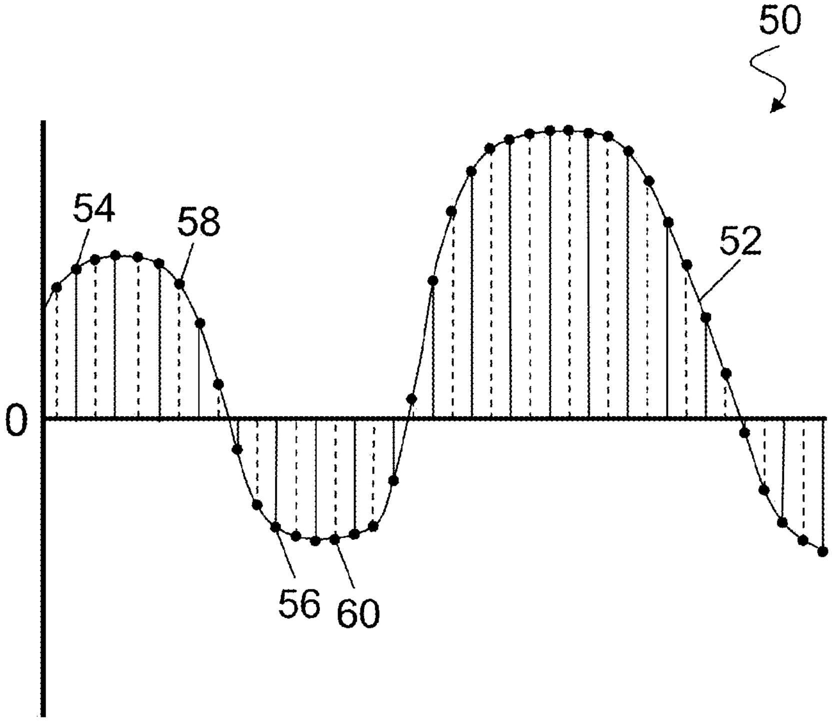
Figure 3:
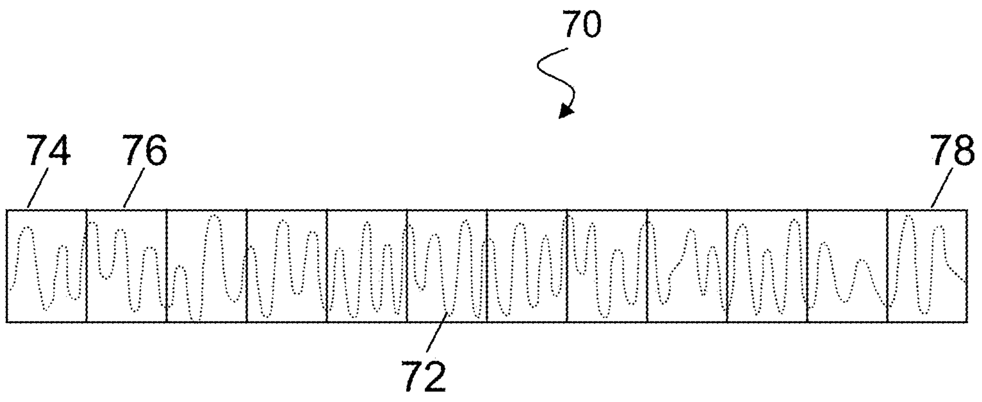
FIG. 3 presents a diagram of an audio signal.

A Fourier transform can be used to convert a representation of an audio signal in the time domain into a representation of the audio signal in the frequency domain. Because an audio signal that is represented using a digital audio file is comprised of discrete samples instead of a continuous waveform, the conversion into the frequency domain can be performed using a Discrete Fourier Transform algorithm, such as the Fast Fourier Transform (FFT). FIG. 3 shows a digitized audio signal 70, in which the waveform 72 is represented by a plurality of discrete samples or points. The digitized audio signal 70 also can be divided into a plurality of equal-sized windows, such as a first window 74, a second window 76, and a last window 78. The window size represents the number of samples included in each window. Because one or more of the windows associated with the digitized audio signal 70 will be processed using an FFT, the window size is set to a power of 2 that corresponds to the size of the FFT, such as 512 samples or 1,024 samples. Additionally, if the last window 78 includes fewer samples than are required to form a full window, additional zero-value samples can be added to complete the window. For example, if the last window 78 only includes 998 samples, 26 zero-value samples can be added to fill in the remainder of the window.

Figure 4:
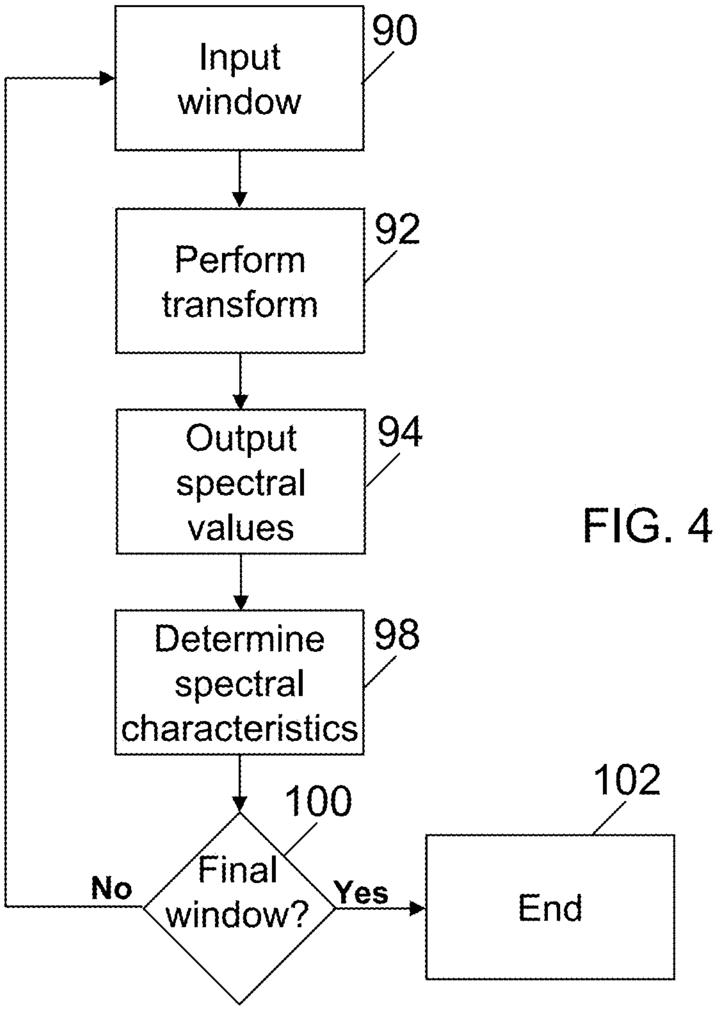
FIG. 4 presents a flowchart describing determining spectral characteristics associated with a digital audio signal.

FIG. 4 presents a flowchart describing an implementation for determining the spectral characteristics associated with a digital audio signal. A window associated with a digital audio signal is selected and the samples included in the window are provided as an input (90) to the FFT algorithm (92 and 94). As discussed above, the window size must equal the size of the FFT so that all of samples input to the FFT can be processed. The FFT transforms the received samples from a time domain representation into a frequency domain representation (92). In performing the transform operation, the audio signal is divided into its component frequencies and the amplitude or intensity associated with each of the component frequencies is determined. The frequency resolution, or number of component frequencies that can be distinguished by the FFT, is equal to one-half of the window size. For example, a 1,024 sample FFT has a resolution of 512 component frequencies or frequency bands. The 512 component frequencies represent a linear division of the frequency spectrum of the audio signal, such as 0 Hz to the Nyquist frequency.

Once the received samples have been transformed, the resulting spectral values are output by the FFT (94). As described above, the spectral values represent the amplitude or intensity values that are associated with each of the component frequencies. The spectral values output from the FFT can be used to determine the spectral characteristics associated with the digital audio signal (98). For example, a maximum amplitude value can be recorded for each of the component frequencies. If the spectral values output from the FFT include an amplitude value associated with a component frequency that exceeds the previous maximum amplitude value recorded for that component frequency, the maximum amplitude value can be updated to reflect the greater value. Further, an average amplitude value also can be recorded for each of the component frequencies and the average amplitude values can be updated as the FFT outputs the spectral values associated with each successive window.

It is also determined whether the final window of the digital audio signal has been transformed by the FFT algorithm (100). If the final window of the digital audio signal has not been transformed, the samples associated with the next window are provided as input to the FFT (90). If the final window of the digital audio signal has been transformed, the transform operation can be terminated (102). The spectral characteristics associated with the digital audio signal can then be compared with the spectral characteristics associated with one or more additional digital audio signals.

Figure 5:
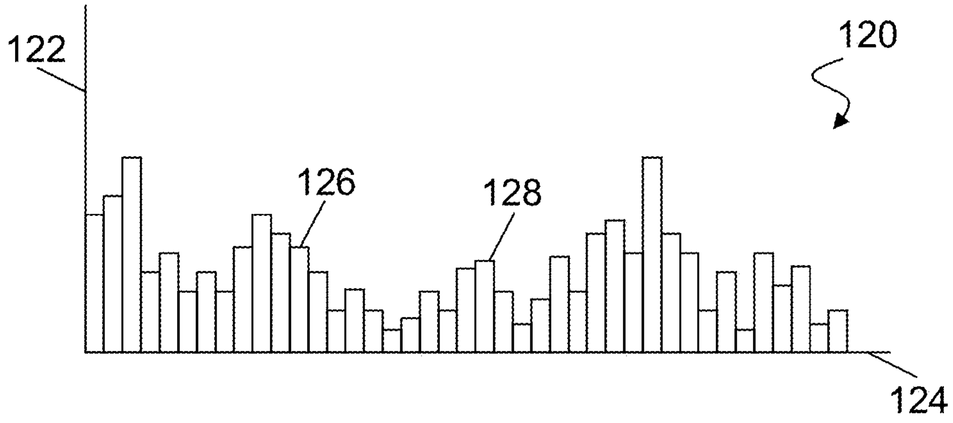
FIGS. 5-6 depict spectral graphs associated with audio signals.

In an implementation, the spectral characteristics associated with a digital audio file can be displayed as a spectral graph. FIG. 5 presents a spectral graph 120 that is associated with a digital audio signal. The spectral graph 120 includes a vertical axis 122, which represents a measure of amplitude or intensity. The units associated with the vertical axis 122 can be ordered linearly, such that each unit represents an equal amount. Alternatively, the units associated with the vertical axis 122 can be ordered in a non-linear manner, such as logarithmically. The spectral graph 120 also includes a horizontal axis 124, which represents a plurality of separate frequencies. For example, the horizontal axis 124 can be used to represent the component frequencies produced by the FFT. Each bar, such as the bars 126 and 128, on the horizontal axis 124 therefore represents a component frequency, or a portion of the range of frequencies included in the digital audio signal, and the height of each bar represents an amplitude or an intensity.

The spectral graph 120 can be generated using the spectral characteristics associated with a digital audio signal and therefore can be used to depict a measure of the amplitudes corresponding to each of the component frequencies associated with the digital audio signal. Additionally, the spectral graph 120 can be used to represent a time component. For example, the values depicted by the spectral graph 120 can represent the amplitude associated with a component frequency at a specific instant in time, an average amplitude associated with a component frequency over a period of time, or a maximum amplitude associated with a component frequency over a period of time.

Figure 6:
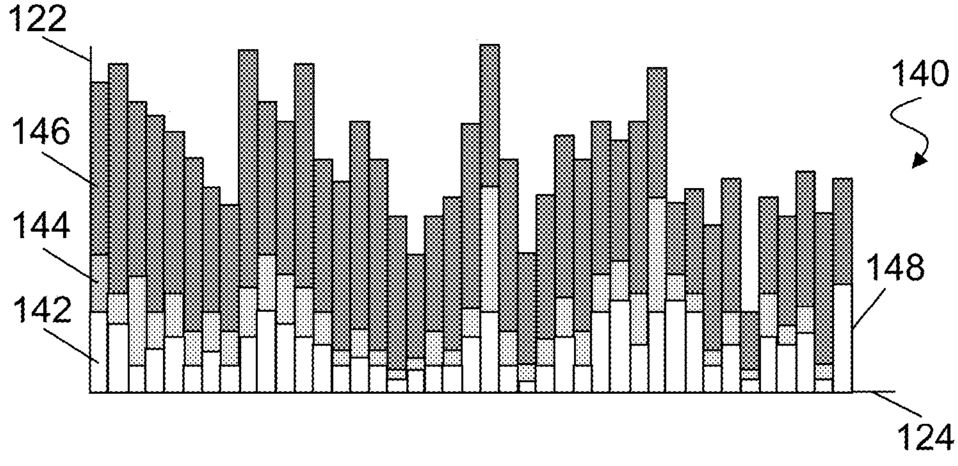

FIG. 6 presents a spectral graph 140 in which three separate amplitude measures can be associated with each component frequency, such as an instant amplitude, an average amplitude, and a maximum amplitude. For example, the first bar 142 associated with the first component frequency in the spectral graph 140 represents the amplitude associated with the first component frequency at a specific instant in time. Further, the second bar 144 associated with the first component frequency indicates the average amplitude associated with the first component frequency over the duration of the audio signal. Finally, the third bar 146 indicates the maximum detected amplitude associated with the third component frequency over the duration of the audio signal. If desired, one or more of the three separate amplitude measures can be excluded from the spectral graph 140. Further, because the amplitude associated with a component frequency at a specific point in time can be the maximum amplitude associated with that component frequency, the bar 148 representing the instant amplitude may periodically obscure the bar representing the average amplitude and the bar representing the previously detected maximum amplitude. Additionally, the spectral graph 140 also can be generated as the associated digital audio signal is played in order to permit "real-time" spectral analysis.

In another implementation, the amplitude measure associated with each component frequency can be represented using a three-dimensional spectral graph. In the two-dimensional spectral graph 140, the first bar 142 associated with the first component frequency is used to represents the amplitude associated with the first component frequency at a specific instant in time. The instantaneous measure is then collapsed into an extended average, which is represented by the second bar 144. Conversely, in the three-dimensional spectral graph, the z-axis represents time. Therefore, the amplitude associated with the each of the component frequencies at a specific instant in time can be continuously displayed. For example, a first row of bars can be used to display the amplitudes associated with each of the component frequencies at a first instant in time, such as a time t. A second row of bars also can be used to display the amplitudes associated with each of the component frequencies at a second instant in time, such as a time t+1. Therefore, a time-based comparison of the digital audio signal can be performed.

Figure 7:
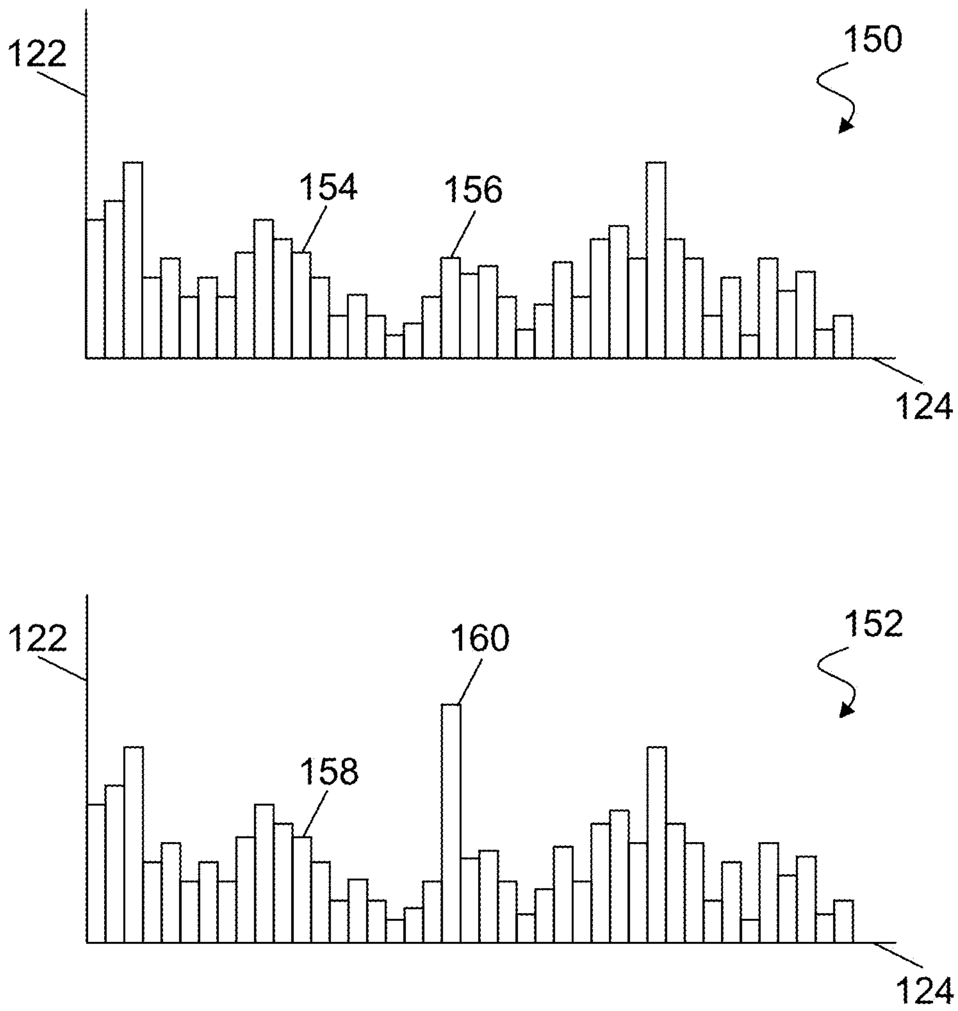
FIG. 7 presents a spectral analysis using spectral graphs.

The contents of two or more digital audio files can be compared by examining their respective spectral graphs. FIG. 7 presents a first spectral graph 150 associated with a first digital audio file and a second spectral graph 152 associated with a second digital audio file. Each of the bars, such as the bars 154, 156, 158, and 160, included in the spectral graphs 150 and 152 represent the average amplitude associated with a particular component frequency. When the first spectral graph 150 is compared with the second spectral graph 152, it can be seen that the average amplitudes associated with corresponding component frequencies are equal. For example, the average amplitude represented by the twelfth bar 154 in the first spectral graph 150 equals the average amplitude represented by the twelfth bar 158 in the second spectral graph 152. It can also be seen, however, that the average amplitude represented by the twentieth bar 160 in the second spectral graph 152 exceeds the average amplitude represented by the twentieth bar 156 in the first spectral graph 150. Therefore, it can be concluded that the content of the first digital audio file differs from the content of the second digital audio file.

Figure 8:
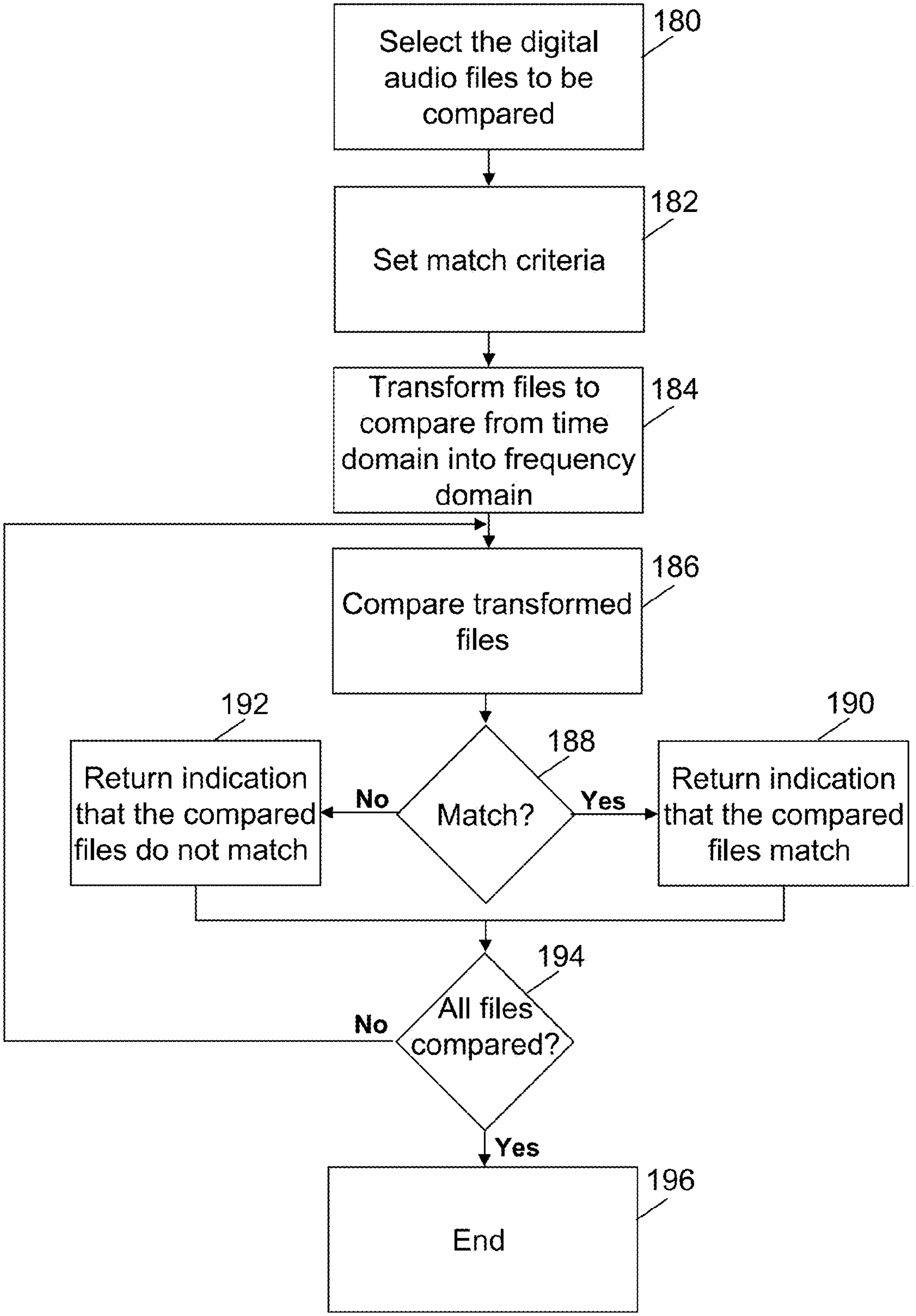
FIG. 8 presents a flowchart describing a content-based comparison of a plurality of digital audio files.

Because a numerical comparison can be performed by a computer, it is not necessary to visually compare spectral graphs. Additionally, a content-based comparison of two or more digital audio files can be performed by a computer in a fraction of the time required to playback an audio signal. FIG. 8 presents a flowchart describing an implementation for automatically performing a content-based comparison of a plurality of digital audio files. This algorithm can be executed by a general purpose computer that includes user interface devices commonly known in the art, such as a computer monitor, LCD display, printer, speaker, microphone, mouse, keyboard, joystick, touch pad, and touch screen.

The content-based comparison can be initiated by selecting the two or more files that are to be compared (180). For example, a user can specify a plurality of digital audio files that are to be compared by selecting the files from a list, entering the file names using an input device, indicating a partial file name or file extension, or providing any combination of such identifiers. Alternatively, a computer can be programmed to periodically perform a content-based comparison of stored digital audio files.

Because a digital audio file is comprised of samples and because the spectral characteristics associated with the file are derived by further processing the samples, some level of difference between two files can be insignificant to the determination of whether the contents of those files are identical or substantially identical. Therefore, it is necessary to establish one or more match criteria defining the degree of difference that can exist between files that are considered to be substantially identical. For example, a first file can be identified as a match for a second file if, for each component frequency, the difference between the amplitude value associated with the first file and the amplitude value associated with the second file does not differ by more than predetermined amount. Alternatively, a first file can be said to match a second file if their respective amplitude values do not differ by more than a predetermined amount for each corresponding component frequency and such insignificant differences are not detected for more than a predetermined number of component frequencies. The degree of identity required in order to classify two digital audio files as matching can vary based on the requirements of an application or the preference of a user. Therefore, the match criteria can be selected from one or more sets of default criteria, or customized to meet one or more specific requirements (182).

As described above, an audio signal represented by a digital audio file can be converted from the time domain into the frequency domain using a transform algorithm, such as the FFT. Therefore, in order to derive the spectral characteristics used to perform the content-based comparison, the audio signals corresponding to each of the two or more digital audio files are transformed using an FFT (184). Additionally, prior to being transformed, the digital audio files can be processed to convert each of the corresponding audio signals to a specified sampling rate.

The spectral values that are generated for the content-based comparison can represent the digital audio file as a whole, such as the average amplitude associated with each component frequency or the maximum amplitude associated with each component frequency as measured over the duration of the audio signal. Further, two or more spectral values also can be compared for each digital audio file, such as the average amplitude and the maximum amplitude associated with each component frequency as measured over the duration of the audio signal. Additionally, the resulting spectral characteristics associated with each of the digital audio files can be stored. For example, the spectral characteristics can be recorded in a temporary memory, such as a temporary file or RAM. Alternatively, the spectral characteristics can be recorded in a permanent memory, such as a permanent file on a hard drive or other nonvolatile storage medium.

In another implementation, a summary of the spectral characteristics can be permanently stored and associated with the digital audio file to which they correspond. Because only a summary of the spectral characteristics is preserved, the information can be efficiently stored. Further, the summary of the spectral characteristics associated with a digital audio file can be quickly compared with the summary of the spectral characteristics associated with one or more additional digital audio files. If a potential match is identified, a more detailed comparison can be performed using the actual spectral characteristics associated with the digital audio files. Therefore, computationally intensive comparisons can be reserved for validating potential matches.

The content-based comparison of a plurality of digital audio files also can be performed incrementally. Instead of comparing the spectral characteristics for the entirety of each audio signal, the spectral characteristics are generated for equal portions of the audio signals so that each portion can be compared individually. Thus, two or more sets of spectral characteristics can be associated with each of the digital audio files to be compared. The sets of spectral characteristics also can be stored in temporary or permanent memory. For an incremental content-based comparison, the comparison (186)

and evaluation (188) operations described below can be performed for each of the corresponding sets of spectral characteristics associated with the digital audio files. Additionally, because the spectral characteristics associated with an audio signal can be generated portion by portion, it is possible to begin performing the comparison (186) and evaluation (188) operations after a first portion corresponding to two or more of the audio signals has been transformed. Alternatively, the comparison (186) and evaluation (188) operations can be performed after each of the audio signals has been completely transformed.

In yet another implementation, it is possible to perform a content-based comparison to determine whether a first digital audio file is included in one or more additional digital audio files. For example, if a first digital audio file representing a portion of a larger audio signal is available, one or more other digital audio files can be evaluated to determine whether they contain the audio signal associated with the first digital audio file. This type of comparison can be used to located a more complete version of the first digital audio file. Further, it is possible to set a start offset, which represents the starting point for the comparison, for one or more of the additional digital audio files. Additionally, a start offset can be used to determine whether an offset between an audio signal represented by a first digital audio file and an audio signal represented by a second digital audio file would account for a perceptible difference in the spectral characteristics corresponding to those signals. For example, a Finite Impulse Response (FIR) filter may emit samples that ramp from a value of 0 to an expected value over a period of several initial samples. Such an offset may result in an incorrect indication that the digital audio files differ if it is not accounted for.

The incremental content-based comparison described above is appropriate for this type of comparison because complete identity between the first digital audio file and a second file is not being sought. The first audio signal associated with the first digital audio file can be transformed into one or more sets of spectral characteristics. The one or more sets of spectral characteristics associated with the first audio signal can then be compared with the spectral characteristics associated with equal portions of one or more additional audio signals. If a match is identified between one or more sets of spectral characteristics associated with the first digital audio file and one or more sets of spectral characteristics associated with a second digital audio file, additional comparisons can be performed to identify the degree to which the first audio signal is included in the second audio signal.

Once the audio signal represented by a digital audio file has been transformed, the resulting spectral characteristics can be compared with the spectral characteristics corresponding to other digital audio files. The content-based comparison between the identified digital audio files is thus carried out using the spectral characteristics associated with those files (186). For example, the amplitude values associated with the digital audio files can be compared for every component frequency to identify any differences.

The results of the comparison between the spectral characteristics associated with each of the plurality of digital audio files can be evaluated in accordance with the match criteria (188). If the identified differences between the spectral characteristics of two or more digital audio files are within the tolerances permitted by the match criteria, those digital audio files are classified as matching. Additionally, when two or more digital audio files are classified as matching, information can be output to indicate that a match has been identified (190). For example, the information can indicate that two particular files are classified as matching. Additional information also can be provided, such as any identified differences between the matching files.

If the identified differences between the spectral characteristics associated with two or more digital audio files exceed the tolerances permitted by the match criteria, those digital audio files are classified as not matching. As with a match, information also can be output to indicate that two or more digital audio files are classified as not matching (192). Also as with a match, additional information can be provided. For example, the differences between the spectral characteristics associated with each of the compared files can be identified. Alternately, a complete list of the spectral characteristics associated with each of the compared files can be provided.

Before the content-based comparison can terminate, it is determined whether all of the comparisons involving the spectral characteristics associated with the plurality of digital audio files have been made (194). If one or more remaining comparisons are identified, the comparison (186) and evaluation (188) operations are performed using the relevant spectral characteristics. If all of the comparisons have been performed, the process is terminated (196).

In another implementation, it is possible to perform a content-based comparison for a plurality of digital audio files that represent multi-channel audio signals. In a multi-channel audio signal, a separate audio signal can be associated with each of a plurality of channels. For example, a digital audio file that represents a stereo signal can include a first audio signal associated with a left channel and a second audio signal associated with a right channel. Therefore, the spectral characteristics associated with each channel of a digital audio file are determined separately. The spectral characteristics corresponding to each of two or more digital audio files can then be compared channel-by-channel, as described above.

Further, as the spectral characteristics associated with multi-channel audio signals are compared channel-by-channel, separate match criteria can be specified for each comparison. For example, in the case of digital audio files representing audio signals encoded in 5.1 Surround Sound, the match criteria specified for a comparison between a first channel associated with each of the digital audio files, such as the signal for the center speaker, may be more restrictive than the match criteria specified for a comparison between a second channel associated with each of the digital audio files, such as the signal for the subwoofer. Because artifacts in low frequency content are likely to be imperceptible or less perceptible after the playback system and the speaker have filtered out the high frequencies, the audio signals represented by the digital audio files may be considered to have sufficient identity even where the spectral characteristics associated with the corresponding low-frequency channels differ by an amount that would be considered significant if present in a higher frequency channel.

A simplified content-based comparison also can be performed for digital audio files that represent multi-channel audio signals. Each of the input channels associated with a digital audio file can be mixed into a single channel. The spectral characteristics associated with the single channel can then be compared with spectral characteristics associated with one or more additional single channel digital audio signals. If a significant correspondence between two or more digital audio files is detected, one of the more accurate content-based comparisons described above can be performed.

In another implementation, a volume scale can be specified for a content-based comparison between a plurality of digital audio files. Because overall frequency levels are being compared, it may be determined that a first file differs from a second file based only on volume. If it is known that one or more of the digital audio files being compared have been subjected to processing that can change the volume, the volume scale can be used to compensate for such changes. For example, if a stereo audio signal is converted to a single channel audio signal, the left channel contribution can be summed with the right channel contribution. In order to maintain the perceptual volume in the resulting single channel audio signal, however, each of the left channel and right channel contributions can be multiplied by some factor, such as 0.707 before they are summed. If it is known that such processing has occurred, the volume scale can be used to compensate for the resulting volume change.

Figure 9:
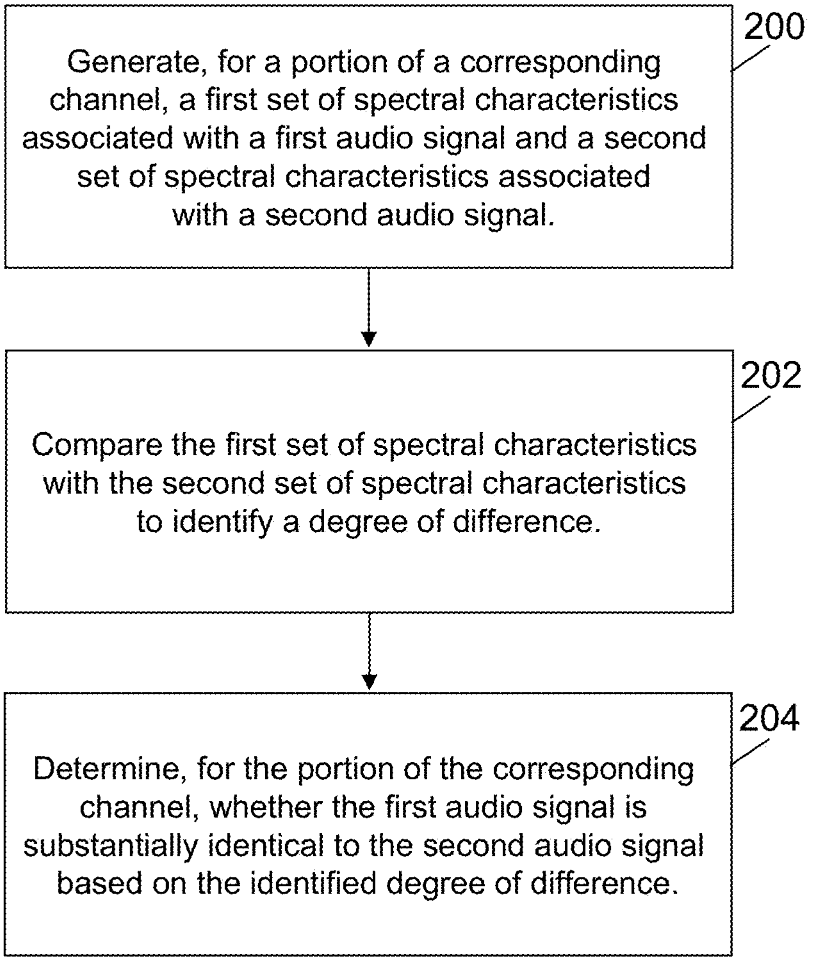
FIG. 9 describes a method of comparing a plurality of digital audio signals.

FIG. 9 describes a method of comparing a plurality of digital audio signals. In a first step 200, a first set of spectral characteristics associated with a first audio signal and a second set of spectral characteristics associated with a second audio signal are generated for a portion of a corresponding channel. In a second step 202, the first set of spectral characteristics are compared with the second set of spectral characteristics to identify a degree of difference. Once the degree of difference has been identified, the third step 204 is to determine, for the portion of the corresponding channel, whether the first audio signal is substantially identical to the second audio signal based on the identified degree of difference.

The techniques described above for performing a content-based comparison of a plurality of digital audio files can be implemented in digital electronic circuitry, or in computer hardware, firmware, software, or in any combination thereof. The techniques can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program implementing the techniques can be written in any form of programming language, including compiled or interpreted languages, and can be deployed in any form, including as a stand alone program or as a module, component, subroutine, or other unit suitable for use in a computing environment. A computer program implementing the techniques also can be deployed to be executed on one computer, on multiple computers at one site, or on multiple computers distributed across multiple sites and interconnected by a communication network.

The techniques described above for performing a content-based comparison of a plurality of digital audio files also can be performed by one or more programmable processors executing a computer program by operating on input data and generating output. The techniques also can be performed by, and can be implemented in, special purpose logic circuitry, such as an FPGA (field programmable gate array) or an ASIC (application specific integrated circuit). Processors suitable for the execution of a computer program include, by way of example, both general and special purpose microprocessors, and any one or more processors of any kind of digital computer.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of comparing audio signals, the method comprising:

generating, using a processor, a first set of spectral characteristics associated with a portion of a first audio signal;

comparing, using a processor, the first set of spectral characteristics with a second set of spectral characteristics associated with a portion of a second audio signal to identify a degree of difference, wherein the portion of the first audio signal is equivalent in duration to the portion of the second audio signal;

receiving user specified match criteria identifying a degree of accuracy;

detecting that the first set of spectral characteristics corresponds to the second set of spectral characteristics when the identified degree of difference is within the degree of accuracy identified by the received user specified match criteria; and determining, in response to the detecting, that the second audio signal includes the portion of the first audio signal.

2. The computer-implemented method of claim 1, wherein the portion of the first audio signal comprises a window of samples.

3. The computer-implemented method of claim 2, further comprising selecting the window of samples based on a Fast Fourier Transform (FFT) size.

4. The computer-implemented method of claim 1, further comprising:

generating another set of spectral characteristics associated with an additional portion of the first audio signal;

comparing the another set of spectral characteristics with a set of spectral characteristics associated with a corresponding portion of the second audio signal to identify an additional degree of difference; and determining that the second audio signal includes the additional portion of the first audio signal when the additional degree of difference is within the degree of accuracy.

5. The computer-implemented method of claim 1, further comprising:

determining a start offset associated with the second audio signal; and selecting the portion of the second audio signal such that it is subsequent to the start offset.

6. The computer-implemented method of claim 1, further comprising:

generating sets of spectral characteristics prior to the comparing, each of the sets of spectral characteristics being associated with a portion of the second audio signal.

7. A system comprising: a computer-readable medium tangibly storing at least a first audio signal and a second audio signal; and a computing system including processor electronics configured to perform operations comprising:

comparing a first set of spectral characteristics associated with a portion of the first audio signal with a second set of spectral characteristics associated with a portion of the second audio signal to identify a degree of difference, wherein the portion of the first audio signal is equivalent in duration to the portion of the second audio signal;

receiving match criteria from a user specifying a degree of accuracy;

detecting that the first set of spectral characteristics corresponds to the second set of spectral characteristics when the identified degree of difference is within the degree of accuracy specified by the match criteria received from the user; and determining, in response to the detecting, that the second audio signal includes the portion of the first audio signal.

8. The system of claim 7, wherein the portion of the first audio signal comprises a window of samples corresponding to a Fast Fourier Transform (FFT) size.

9. The system of claim 7, wherein the computer-readable medium further stores sets of spectral characteristics associated with the second audio signal.

10. The system of claim 9, wherein the processor electronics are further configured to perform operations comprising:
- selecting the second set of spectral characteristics from the stored sets of spectral characteristics associated with the second audio signal.

11. The system of claim 7, wherein the processor electronics are further configured to perform operations comprising:
- generating an additional set of spectral characteristics associated with a subsequent portion of the first audio signal;
- comparing the additional set of spectral characteristics with a set of spectral characteristics associated with a corresponding portion of the second audio signal to identify an additional degree of difference; and
- determining that the second audio signal includes the subsequent portion of the first audio signal when the additional degree of difference is within the degree of accuracy.

12. The system of claim 7, wherein the processor electronics are further configured to perform operations comprising:
- determining a start offset associated with the second audio signal; and
- selecting the portion of the second audio signal such that it is subsequent to the start offset.

13. The system of claim 7, wherein the processor electronics are further configured to perform operations comprising:
- generating the first set of spectral characteristics and the second set of spectral characteristics such that they represent amplitude values for corresponding component frequencies.

14. A non-transitory computer-readable storage medium, tangibly embodying a computer program product configured to cause data processing apparatus to perform operations comprising:
- generating a first set of spectral characteristics associated with a portion of a first audio signal;
- comparing the first set of spectral characteristics with a second set of spectral characteristics associated with a portion of a second audio signal to identify a degree of difference, wherein the portion of the first audio signal is equivalent in duration to the portion of the second audio signal;
- receiving match criteria from a user specifying a degree of accuracy;
- detecting that the first set of spectral characteristics corresponds to the second set of spectral characteristics when the identified degree of difference is within the degree of accuracy specified by the match criteria received from the user; and
- determining, in response to the detecting, that the second audio signal includes the portion of the first audio signal.

15. The non-transitory computer-readable storage medium of claim 14, wherein the portion of the first audio signal comprises a window of samples corresponding to a Fast Fourier Transform (FFT) size.

16. The non-transitory computer-readable storage medium of claim 14, wherein the computer program product is further configured to cause data processing apparatus to perform operations comprising:
- comparing the first set of spectral characteristics with a third set of spectral characteristics associated with a portion of a third audio signal to identify a degree of difference, wherein the portion of the first audio signal is equivalent in duration to the portion of the third audio signal;
- detecting that the first set of spectral characteristics corresponds to the third set of spectral characteristics when the identified degree of difference is within a degree of accuracy; and
- determining, in response to the detecting, that the third audio signal includes the portion of the first audio signal.

17. The non-transitory computer-readable storage medium of claim 14, wherein the computer program product is further configured to cause data processing apparatus to perform operations comprising:
- determining a start offset associated with the second audio signal; and
- selecting the portion of the second audio signal such that it is subsequent to the start offset.

18. A computer-implemented method of comparing audio signals, the method comprising:
- generating, using a processor, sets of spectral characteristics associated with a first audio signal and sets of spectral characteristics associated with a second audio signal;
- comparing, using a processor, the sets of spectral characteristics associated with the first audio signal with corresponding sets of spectral characteristics associated with the second audio signal to identify a degree of difference, wherein corresponding sets of spectral characteristics are individually compared;
- receiving a user specified degree of accuracy; and
- determining that the second audio signal includes the first audio signal when the identified degree of difference compares in a predetermined manner to the user specified degree of accuracy.

* * * * *